Figure 1:
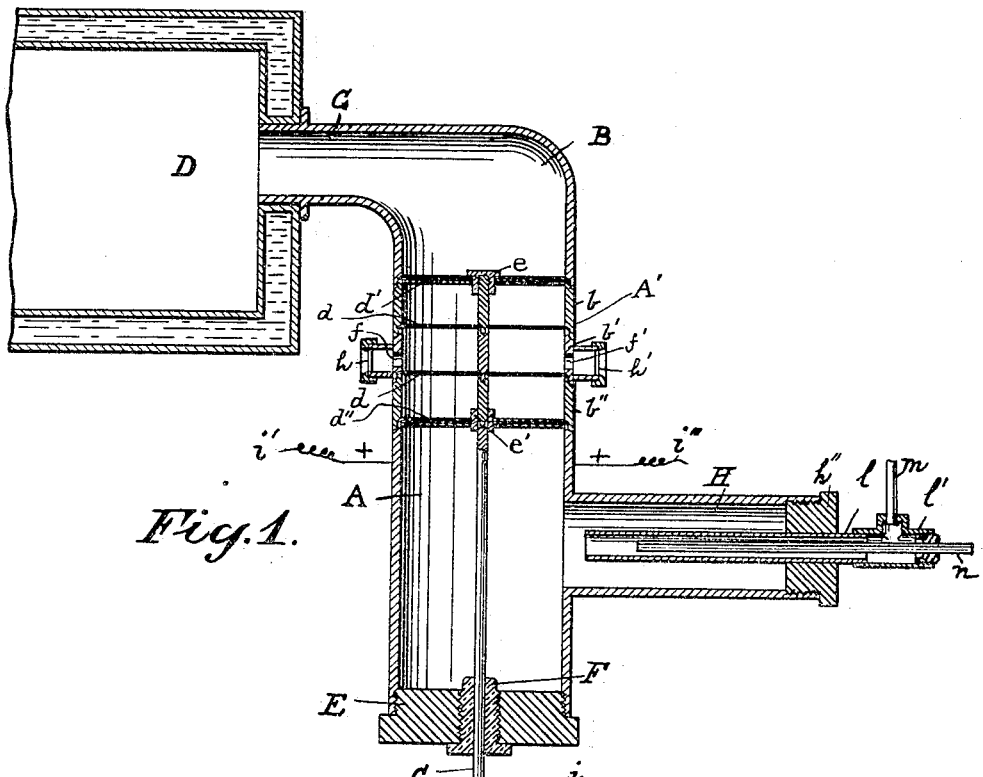

No. 769,585. PATENTED SEPT. 6, 1904.
H. S. BLACKMORE.
PROCESS OF MAKING SULFURIC ANHYDRID.
APPLICATION FILED MAY 10, 1901.
NO MODEL. 2 SHEETS—SHEET 1.

Witnesses:
H. N. Jenkins
C. C. Wright

Inventor:
Henry Spencer Blackmore

No. 769,585. PATENTED SEPT. 6, 1904.
H. S. BLACKMORE.
PROCESS OF MAKING SULFURIC ANHYDRID.
APPLICATION FILED MAY 10, 1901.
NO MODEL. 2 SHEETS—SHEET 2.

Witnesses
Warren C. Stone
H. N. Jenkins

Inventor
Henry Spencer Blackmore

No. 769,585.                                                    Patented September 6, 1904.

UNITED STATES PATENT OFFICE.

HENRY SPENCER BLACKMORE, OF MOUNT VERNON, NEW YORK.

PROCESS OF MAKING SULFURIC ANHYDRID.

SPECIFICATION forming part of Letters Patent No. 769,585, dated September 6, 1904.

Application filed May 10, 1901. Serial No. 59,586. (No specimens.)

*To all whom it may concern:*

Be it known that I, HENRY SPENCER BLACKMORE, a citizen of the United States, residing at 206 South Ninth Avenue, Mount Vernon, in the county of Westchester and State of New York, have invented certain new and useful Improvements in Processes of Making Sulfuric Anhydrid; and I do hereby declare the following to be a full, clear, and exact description of the invention, such as will enable others skilled in the art to which it appertains to make and use the same.

The object of my invention is to produce sulfuric anhydrid ($SO_3$) by the oxidation of sulfur dioxid, ($SO_2$); and it consists in supplying enough heat to refrigerated gas containing sulfur dioxid and oxygen to perform a reaction between the same, by which means of refrigeration and controlled heat the temperature is maintained below the dissociating-point of the sulfuric anhydrid produced.

My invention, broadly stated, consists in combining sulfur dioxid and oxygen of a fluid containing oxygen at a temperature which is below the temperature at which sulfuric anhydrid dissociates and maintaining the thermal condition below said dissociating-point by internal refrigeration, whereby the production of sulfuric anhydrid may be carried on in a continuous manner at will.

My invention, specifically stated, relates to certain new and novel features and steps for performing a reaction between sulfur dioxid and oxygen, thus producing sulfuric anhydrid without depending upon so-called "contact substances" or catalytic action—such as platinized asbestos, &c.—which soon become inoperative by absorption or saturation of gases and have to be regenerated by expensive chemical process to regain their activity; and it consists in supplying heat to a refrigerated gaseous body containing sulfur dioxid and oxygen, said heat being generated by a source of energy other than the chemical combination between the sulfur dioxid and the oxygen employed, whereby sulfur dioxid and oxygen may be united, producing sulfuric anhydrid in a positive and continuous manner at will, the thermal condition of the reacting or combining ingredients being maintained below the dissociating-point of sulfuric anhydrid by the abstraction of heat therefrom by the action of the refrigerated gas or fluid associated therewith.

Prior to my invention, which is broadly claimed in my United States Patent No. 11,995, (reissue,) dated May 27, 1902, original filed February 16, 1900, it has been proposed to produce sulfuric anhydrid by the direct combination of sulfur dioxid and oxygen; but during the performance of the process employed the temperature was unrestrained, and therefore rose from the liberation of heat by reaction until the decomposing temperature of sulfuric anhydrid was reached, thus terminating the process before the chemical reactions were wholly completed, and no means were devised or anticipated for preventing said rise in temperature, for the reason that the cause of the fact had not been ascertained.

My process is to be distinguished from the processes of prior art by the fact that as an additional step I positively maintain the temperature within the reaction or combining sphere below that at which the decomposition of sulfuric anhydrid takes place.

In carrying out my invention for the production of sulfuric anhydrid I proceed as follows, reference being had to the accompanying drawings, which illustrate a preferred form of apparatus which I employ for the purpose.

Figure 2:
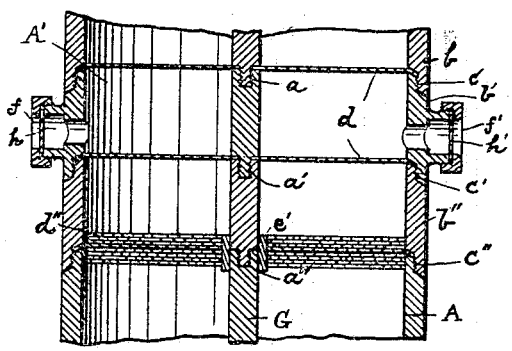
Figure 3:
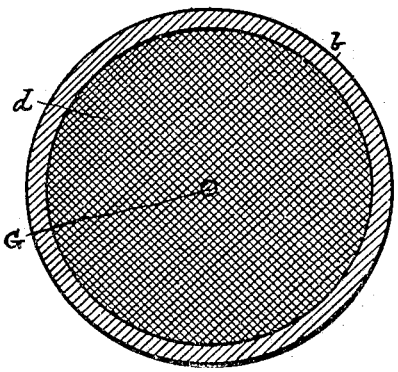
Figure 4:
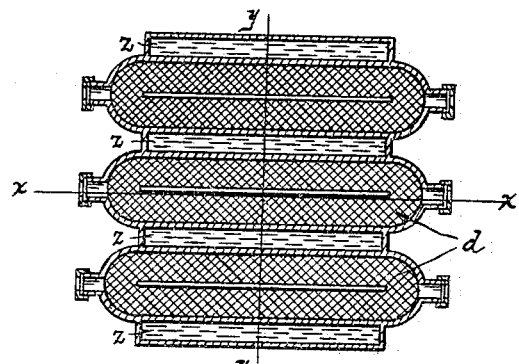
Figure 5:
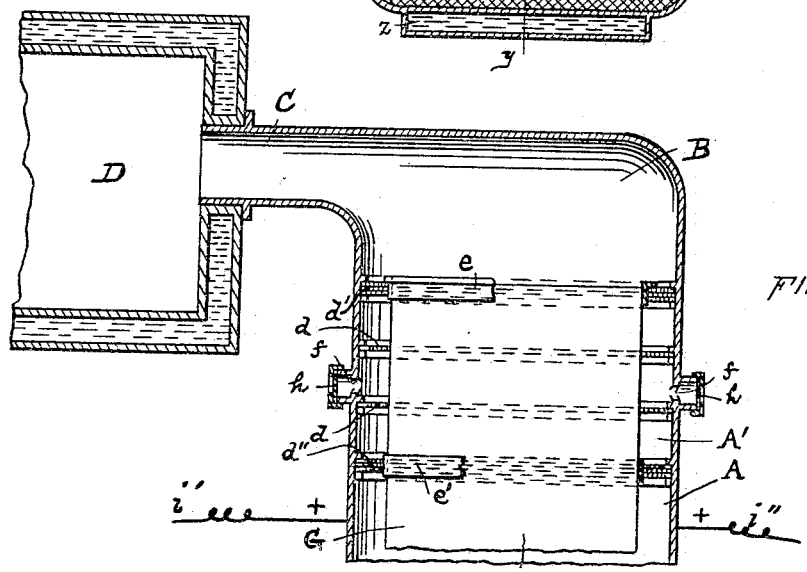
Figure 6:
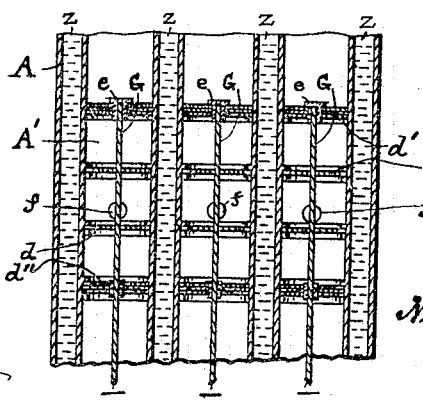

Referring to the drawings, Figure 1 is a vertical longitudinal section of my apparatus. Fig. 2 is an enlarged vertical section showing the electric diaphragms and the connections of the transforming-chamber. Fig. 3 is a cross-section of one of the rings of the electric connection of the transforming-chamber and an electric gauze diaphragm connected therewith. Fig. 4 is a transverse section of a modified form of apparatus, showing the transforming compartments of elongated form and provided with water-jackets. Fig. 5 is a vertical longitudinal section of the apparatus on the lines $x\ x$, Fig. 4; and Fig. 6 is a transverse vertical section on the lines $y\ y$, Fig. 4.

Similar letters refer to corresponding parts in the several views.

The letter A designates an igniting or combustion chamber in which the gases are transformed, and for the purpose of uniformity will be hereinafter referred to as the "transforming-chamber." This chamber is of cylindrical or other form, provided at its top with an elbow B and pipe C, the latter connected with a jacketed condenser D in any desired air-tight manner.

The lower end of the transforming-chamber A, which constitutes a refrigerating and mixing chamber, is provided with a detachable head E, having a central stuffing-box or screw-threaded plug F, of insulating material, connected therewith, and in which is fitted a rod or electric connection G, the upper portion of which is formed in sections having screw-threaded connections, as shown at $a\ a'\ a''$ in Fig. 2.

The transforming-chamber A, like the electric connection G, is partly composed of sections, as shown at $b\ b'\ b''$, (see Figs. 1 and 2,) the said sections being joined together by the threaded ends $c\ c'\ c''$.

A series of metallic gauze diaphragms $d$, preferably of gold-plated copper, are arranged within the transforming-chamber A, the said diaphragms being securely held in relative positions by the abutting shoulders of the screw-threaded ends of the transforming-chamber rings and of the central connection thereof. The upper and lower diaphragms $d'$ and $d''$ are arranged in several thicknesses, forming a heat-absorber and flash-preventer, and insulated from the electric connection G, as shown at $e\ e'$, for the purposes hereinafter fully described. Peep-holes $f\ f'$, having mica fronts or covers $h\ h'$, are located at the opposite sides of the combustion or tranforming compartments A' to enable the attendant to view the interior thereof and provide for regulating the apparatus as occasion may require.

The letters $i$ and $i'$ and $i''$ designate electric wires, which are respectively connected with the electric conductor G and the walls of the transforming-chamber A by ordinary means.

The lower part of the transforming-chamber is provided horizontally with a pipe-section H, having a detachable end or head $h''$, within which is tightly fitted a tube $l$, the latter provided with a T-head $l'$ and an inlet-pipe $m$, while within the stem of the T-head and the tube $l$ is arranged a pipe $n$ for the purposes hereinafter fully specified.

In constructing an apparatus for carrying out my invention on a manufacturing scale it is found advisable not to have the heating gauze diaphragms $d\ d$ of a width greater than two inches from the central conductor on account of the tendency of the same to sag, become overheated, and fuse. I therefore prefer the form of apparatus as shown in Figs. 4, 5, and 6, wherein it is seen that the transforming-chambers are of elongated form and the central conductor instead of a rod consists of a strip of metal. This form of transforming apparatus is adapted to carry a heating gauze diaphragm of from three to four feet in length and four inches in width—i. e., two inches on either side of the central conductor, which extends through the center of the transforming-chamber to within two inches of either end, as shown in Fig. 4. In constructing a battery of this form of apparatus it is advisable to separate the individual sections from each other by means of a water-jacket $z\ z$, which assists in maintaining the gases in a refrigerated condition, whereby the reaction is regulated by supply of heat thereto by means of heated gauze diaphragms. In all other particulars this preferred and modified form of apparatus is illustrated in Figs. 4, 5, and 6 in parts corresponding to Figs. 1, 2, and 3 except in form and construction, the same letters of reference referring to corresponding parts in the several views.

In the operation of my invention for the production of sulfuric anhydrid I take sulfuric dioxid and compress the same to liquid form in a suitable reservoir connected with the pipe $n$ and controlled by a valve. I then introduce oxygen or ordinary air containing oxygen through the pipe $m$ and gradually introduce the sulfur dioxid through the pipe $n$, the oxygen and sulfur dioxid becoming thoroughly mixed in the lower part of the transforming-chamber A, which constitutes a refrigerating and mixing chamber. The expansion of the sulfur dioxid introduced refrigerates the mixture because of its greater and selective affinity for absorbing heat and is so regulated that the refrigeration of the mixed gases will equalize the amount of heat liberated and absorbed during the reaction or oxidation of the sulfur dioxid to sulfuric anhydrid. The mixed gases then pass up through the insulated gauze flash-preventer $d'$ into the transforming-chamber A'. A current of electricity is then passed through the connections $i\ i'\ i''$, the same passing through the diaphragms $d\ d$, heating them in proportion to the strength of the current—either low or to whiteness—the temperature being somewhat gaged by the color of the diaphragm, which can be observed through the mica-closed peep-holes $f\ f'$. As the mixture of sulfur dioxid and oxygen or inert gas containing oxygen comes in contact with the heated gauze diaphragms a reaction takes place, which may be illustrated by the following chemical formula or equation:

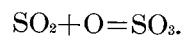
$$SO_2 + O = SO_3.$$

The current of gases introduced passing rapidly through the apparatus carries the product of the reaction—i. e., sulfuric anhydrid—quickly through or away from the heated gauze diaphragms, and at the same time the temperature is prevented from rising to the dissociating-point by the refrigerated gases introduced and then through the flash-preventer $d''$, which consists of a number of layers of gauze, insulated, as before described, from the central conductor, and thus also acts as a strainer or absorbent of any excess of heat and conveys it away, the sulfuric anhydrid being finally condensed in the jacketed condenser D, from which it may be removed from time to time as desired. In inducing the reaction between sulfur dioxid and oxygen in their refrigerated condition I heat the igniting gauze diaphragms $d\ d$ to a bright-red heat by passing a current of electricity therethrough and gradually pass the refrigerated gas containing sulfur dioxid and oxygen through the same. At first the heated diaphragm induces or starts the reaction by igniting the gases, and then the flow of electricity is gradually cut off until the diaphragm is maintained at a low red heat and so regulated that the temperature within the transforming-chamber $A'$ will not rise above the dissociating-point of sulfuric anhydrid. The heat liberated by the union of sulfur dioxid with oxygen, together with the small amount supplied by the said diaphragm, serves to continually induce a reaction in the flowing refrigerated gas, the temperature thereby never being able to reach the point of dissociation, and therefore a refrigeration of the product thereafter to prevent its after-dissociation is wholly unnecessary. As the sulfurous gases first come in contact with the gold-plated copper-gauze it combines therewith, forming a coating of auricupric sulfid, which prevents further action on the metal parts and isolates the metal from further contact with the surrounding gases or fluids, but does not prevent the passage of heat therethrough for the purpose of inducing reaction or combination between the sulfur dioxid and oxygen when the gauze is subjected to the action of an electric current. This coating remains, isolating the metal parts from the gases and preventing contact therewith so long as the sulfurous gases are in excess. It is therefore advisable to maintain an excess of sulfur dioxid, which permanently prevents disintegration of the insulating sulfurous coating and corrosion of apparatus by oxidation. The proportion of gases in case sulfur dioxid and oxygen alone are employed is preferably in proportion of ten of sulfur dioxid to one of oxygen, the said sulfur dioxid being introduced in a refrigerated or condensed condition, so that on expansion it exerts a refrigerating effect. It can be seen that the small amount of oxygen in proportion to the amount of sulfur dioxid transforms only a part of the sulfur dioxid into sulfuric anhydrid on passing through the heated diaphragm, the excess of sulfur dioxid being employed to prevent by absorption the liberation of sensible heat, the changing condition or expanding of diluent neutralizing heat which would become sensible or apparent in a mixture of sulfur dioxid and oxygen in equivalent proportions without the heat-absorbing properties of diluent, and the sulfur dioxid when in excess of reacting proportions is practically inert. After the oxidation of a portion of sulfur dioxid to sulfuric anhydrid in the body of refrigerated sulfur dioxid the mixture of sulfur dioxid and sulfuric anhydrid is passed through the water-jacketed condenser D, where the sulfuric anhydrid is condensed and the excess of sulfur dioxid conducted therefrom, recompressed, and again employed as before. It is obvious if I oxidize sulfur dioxid to sulfuric anhydrid in any other body of refrigerated gas, such as nitrogen, the proportion may be regulated as the occasion may demand; but one part of a mixture of sulfur dioxid and oxygen to twenty parts of nitrogen gas refrigerated to minus 32° Fahrenheit is found a sufficient proportion of refrigerated inert diluent when maintaining the heated igniting-diaphragm at low redness. The refrigerated gas containing sulfur dioxid and oxygen should never be passed through the heated diaphragm at a greater speed than will cool and maintain the heated diaphragm to a low red heat.

It will be observed that my process consists in heating a refrigerated gas containing sulfur dioxid and oxygen up to a point of union, whereby the heat which would ordinarily be liberated by reaction and heat supplied thereto maintains the reacting sphere at a low red heat in the presence of an expanding diluent having a great capacity for absorbing heat, the temperature thus never reaching the dissociating-point of the product, therefore obviating the necessity of cooling the product to maintain it below the dissociating-point. It should also be understood that the red heat of the electric diaphragms $d\ d$, which act merely as an igniter of the gases in the igniting or transforming chamber $A'$, is not indicative of the actual temperature which prevails within the reaction or combining sphere, it being obvious that the entering gases will reduce the temperature in said sphere to a greater extent than they will reduce the temperature of said electric diaphragm, which, as has been seen, is heated by the electric current.

It will be observed that the transforming-chamber $A'$, in which the electrically-heated diaphragms are located, is protected at the inlet and outlet portions with heavy insulated gauze sections, which prevent the ignited mixture of gases in said chamber from conveying the flash outside of the chamber and admit of controlling the temperature and product by the rapidity of admission of gases thereto during transformation, the electric diaphragms $d\ d$ being maintained at a uniform temperature, and by carefully regulating the temperature of the electric diaphragms $d\ d$ in conformity with the refrigerated gases introduced the production of sulfuric anhydrid may be carried on continuously without interruption.

It is obvious that I can introduce other refrigerating fluid, such as carbon dioxid mixed with the sulfur dioxid and oxygen or gas containing oxygen, whereby the refrigeration may be produced by the expansion of the carbon dioxid in place of the sulfur dioxid, as aforementioned, or I can refrigerate the gases introduced into the transforming-chamber in any convenient manner, the object being to supply to the transforming-chamber A' a mixture of gases containing oxygen and sulfur dioxid in such a refrigerated or cooled condition as to neutralize the excess of heat liberated by the oxidation of the sulfur dioxid in the production of sulfuric anhydrid and also any excess of heat which might be absorbed from the heated or igniting electric diaphragm, thereby concurrently abstracting the heat and maintaining the temperature below the dissociating-point of sulfuric anhydrid.

It can be readily seen that the heated diaphragms $d\ d$ in the transforming-chamber A' serve to ignite the mixture of oxygen and sulfur dioxid as it comes in contact therewith, and the excess of heat either absorbed therefrom or liberated by the reaction over and above that neutralized by the refrigerated gases introduced is carried away from the heated diaphragms by the rapid-flowing gases admitted and the heat-absorbing gauze diaphragms $d''$.

I find it of great advantage in carrying out my process for producing sulfuric anhydrid commercially to mix the sulfur dioxid and oxygen with an inert gas, preferably in quantity which is largely in excess of the sulfur dioxid and oxygen, whereby two important results are obtained—first, the oxygen is diluted to such a degree that corrosion of apparatus is largely avoided, and, second, the diluted mixture of sulfur dioxid and oxygen reacting in the body of inert gas is more readily controlled, as the heat liberated by reaction is more gradual. The mixture of sulfur dioxid and oxygen with inert gas for the purpose of controlling and regulating the reaction, as aforesaid, is an important factor in the performance of my invention, the percentage of inert gas mixed with the sulfur dioxid and oxygen being gaged by the temperature of gases admitted and the affinity of inert gas for heat. The gas which I find most preferable for the purpose is nitrogen gas, which does not enter into the reaction so long as the sulfur dioxid is in equivalent or excessive percentage of the oxygen content. The inert gas may be introduced either as a direct diluent of the oxygen through the pipe $m$ or as a diluent of the sulfur dioxid introduced through the pipe $n$, or both, as desired.

It can be readily seen that by my process the reaction between the oxygen and sulfur dioxid is positive and controlled, the ignition being induced by a positive and controlled means—viz., an electrically-heated gauze diaphragm through which the mixture of gases have to pass—and therefore is not subject to the difficulties found by employing catalytic or contact substances, which soon become inoperative by absorption or saturation of gases and can only be reused by expensive process of separation and regeneration.

The volume of inert gas as employed by my process being in such proportion as to prevent the heat liberated by the combination of sulfur dioxid and oxygen from reaching the dissociating-point of sulfur trioxid is conveyed through condenser D, where the sulfuric anhydrid condenses in crystalline form and the inert gas reconducted to a reservoir, from which it can be again employed from time to time by mixing with more sulfur dioxid and oxygen and conveying through the apparatus and the transforming-chamber A'.

In practically manipulating my process for producing sulfuric anhydrid, as hereinbefore set forth, it will be understood that the mixture of sulfur dioxid and oxygen will only combine in equivalent proportions as the heat is supplied thereto and reaction maintained in refrigerated atmosphere. Any excess of sulfur dioxid or oxygen over and above the equivalent proportion may be mixed with more sulfur dioxid or oxygen, as the deficiency in the case may be, and reconducted through the apparatus, the process being regulated and maintained continuously by passing enough electricity through the igniting-diaphragms to heat the same, and thus start or induce the reaction between sulfur dioxid and oxygen, and gradually introducing oxygen, sulfur dioxid, and refrigerated gas in regulated and sufficient proportions to maintain the reaction continuously without excessive heat, the proportion of refrigerated inert gas, sulfur dioxid, and oxygen being regulated and may be varied from time to time as desired to maintain a perfect reaction.

It will be noted in my process, as specifically set forth, that sulfur dioxid and oxygen are combined within a body of refrigerated fluid, the reaction being induced and maintained by supplying heat to the mixture from a source of energy other than the chemical combination of oxygen with sulfur dioxid.

The term "inert" as employed in this specification and claims with reference to fluids associated with reacting or combining ingredients has particular reference to fluids not entering into the reaction or combination and is intended to include any excess of any combining agent over the equivalent combining proportion which remains inert because of the absence of agent with which to combine, as well as an actual inert constituent of the fluid *per se*, and the term "fluid containing oxygen" is intended to imply a fluid which may be either pure oxygen or containing oxygen in such proportion or association as to be available for the purpose of oxidizing sulfur dioxid to sulfuric anhydrid under conditions set forth.

The terms "without depending upon so-called contact substances or catalytic action" as employed in this specification has reference to means independent of or other than catalysis for inducing a reaction between sulfur dioxid and oxygen. A contact substance, chemically speaking, implies a substance or material having a peculiar natural and attractive property of condensing substances, such as gases, upon its surface to a point where in their close contact a combination or transformation is naturally induced by thus being brought within the scope of their mutual attractions by attractive and contractive properties of the substance employed, the condensation simultaneously generating enough heat to cause ignition and combination of the associated fluids, and the process involved is known as "catalysis." It will be seen that my process is one of simple primary expansion or combustion of sulfur dioxid and oxygen, producing sulfuric anhydrid, whereby the liberation of sensible heat is prevented by the expansion of retaining refrigerated fluid of inert nature, the process being induced and maintained by supplying heat thereto within the body of inert refrigerated fluid and is not dependent upon the action of contact substances or catalysis in any manner whatsoever.

It will be noted in cases where contact substances are employed as a means for inducing reaction between sulfur dioxid and oxygen or oxidizing sulfur dioxid in the production of sulfuric anhydrid that the union is induced by condensation of the gases upon the surface of the contact substances to a point at which their affinities are brought within the scope of their mutual attractions, while in my process the oxidation of sulfur dioxid is induced in an expanding condition by the action of heat, which brings the uniting constituents to the point of combustion, the heat liberated thereafter by the progressive union being abstracted or removed from the sphere of combination by the presence of an inert fluid having a greater or selective affinity for heat than the reacting ingredients or their products.

It has been proposed to oxidize sulfur dioxid through the mediation of contact substances and abstract the heat evolved thereby by external cooling means, in which case it can be readily seen that the apparatus becomes elevated in temperature to a point equal to that of its reacting content, the heat being abstracted through the apparatus, and it has also been proposed to prevent the dissociation of sulfuric anhydrid which has been produced by contact action by cooling the product after formation to keep it below the dissociating-point. My process, however, consists in inducing a reaction or combination between sulfur dioxid and oxygen or in oxidizing sulfur dioxid while in the presence of an inert fluid having a greater or selective affinity for heat, whereby the heat which would ordinarily be evolved in the formation of sulfuric anhydrid is immediately absorbed, abstracted, or neutralized within the body of reacting ingredients and whereby the temperature of the apparatus is prevented from becoming elevated to any considerable degree, thereby not only increasing the yield of sulfuric anhydrid, but also preventing the corrosion of apparatus which has been so detrimental heretofore.

The term "selective" as used in this specification and claims to qualify the heat-absorbing property of one of the fluids employed is intended to imply a fluid which has an affinity for absorbing heat in preference to the heat-absorbing properties of the uniting ingredients or products thereof during reaction or combination.

Having now described my invention, what I claim as new, and desire to secure by Letters Patent, is—

1. The process of making sulfuric anhydrid which consists in combining sulfur dioxid with oxygen while retained within a body of refrigerated inert fluid.

2. The process of making sulfuric anhydrid which consists in inducing a reaction between sulfur dioxid and oxygen by action of heat on the same, in a refrigerated inert gas, thereby keeping the temperature from rising to the dissociating-point of the sulfuric anhydrid produced.

3. The process of making sulfuric anhydrid which consists in inducing a reaction between sulfur dioxid and oxygen, by the action of heat supplied thereto and maintaining the reaction continuously by conveying thereto a gas containing sulfur dioxid and oxygen at a temperature and in volume sufficient to prevent the temperature of reaction from rising to the dissociating-point of sulfuric anhydrid.

4. The process of making sulfuric anhydrid which consists in performing a reaction between sulfur dioxid and oxygen by supplying heat thereto while in a volume of inert gas capable of preventing the accumulation of heat during transformation to a point at which sulfuric anhydrid dissociates.

5. The process of making sulfuric anhydrid which consists in conveying a gaseous mixture containing sulfur dioxid and oxygen into a transforming-chamber, inducing a reaction between the sulfur dioxid and oxygen therein by supplying heat thereto and maintaining the reaction continuously by supplying thereto a volume of inert gas in sufficient proportion to prevent the heat liberated from reaching the dissociating-point of sulfuric anhydrid.

6. The process of making sulfuric anhydrid which consists in supplying to a refrigerated gas, containing sulfur dioxid and oxygen, enough heat to induce a reaction between the same without permitting the temperature at the point of reaction to rise above the dissociating-point of sulfuric anhydrid.

7. The process of making sulfuric anhydrid which consists in mixing sulfur dioxid and oxygen with an inert gas and inducing a reaction between them by supplying heat thereto while in a state of dilution which will prevent the accumulation of heat to the dissociating-point of sulfuric anhydrid.

8. The process of making sulfuric anhydrid which consists in performing a reaction between sulfur dioxid and oxygen by supplying heat thereto while in an inert heat-absorbing fluid of sufficient volume to prevent the temperature from rising to the dissociating-point of sulfuric anhydrid.

9. The process of making sulfuric anhydrid which consists in oxidizing sulfur dioxid in a volume of inert heat-absorbing fluid sufficient to maintain the temperature below the dissociating-point of sulfuric anhydrid.

10. The continuous process of making sulfuric anhydrid which consists in employing a volume of inert heat-absorbing fluid, introducing into the same a mixture of sulfur dioxid and oxygen, conveying the same through an igniting or transforming chamber, inducing reaction therein by supplying heat thereto, condensing the sulfuric anhydrid produced therefrom, and mixing therewith more sulfur dioxid and oxygen and continuing the process as hereinbefore set forth.

11. The process of making sulfuric anhydrid which consists in inducing and maintaining a reaction between sulfur dioxid and oxygen while retained within a body of inert refrigerated fluid, by supplying heat to the said sulfur dioxid and oxygen within a refrigerated fluid, whereby the liberation of sensible heat by reaction is prevented.

12. The process of making sulfuric anhydrid which consists in oxidizing sulfur dioxid while subjected to the internal cooling influence of a heat-absorbing fluid sufficient to maintain the temperature of the reacting ingredients below the dissociating-point of sulfuric anhydrid.

13. The process of making sulfuric anhydrid which consists in combining sulfur dioxid with fluid oxygen while subjected to the internal influence of a heat-absorbing fluid sufficient to maintain the temperature below the dissociating-point of sulfuric anhydrid.

14. The process of making sulfuric anhydrid which consists in combining, at a temperature maintained below the dissociating-point of sulfuric anhydrid by internal refrigeration, sulfur dioxid and the oxygen of a fluid containing oxygen.

15. The process of making sulfuric anhydrid which consists in exposing, at a temperature maintained below the dissociating-point of sulfuric anhydrid by internal refrigeration, and at a reacting temperature, sulfur dioxid to the action of a fluid containing oxygen.

16. The process of making sulfuric anhydrid which consists in conveying to a sphere in which the temperature is maintained below the dissociating-point of sulfuric anhydrid by internal refrigeration, and at a reacting temperature, sulfur dioxid in contact with a fluid containing oxygen.

17. The process of making sulfuric anhydrid which consists in conveying to a sphere in which the temperature is maintained below the dissociating-point of sulfuric anhydrid by internal refrigeration, and at a reacting temperature, sulfur dioxid in contact with a fluid containing oxygen and an inert fluid.

18. The process of making sulfuric anhydrid which consists in conveying to a sphere in which the temperature is maintained below the dissociating-point of sulfuric anhydrid by internal refrigeration, and at a reacting temperature, sulfur dioxid in contact with a fluid containing oxygen, one of said materials being in excess.

19. The process of making sulfuric anhydrid which consists in conveying to a sphere in which the temperature is maintained below the dissociating-point of sulfuric anhydrid by internal refrigeration, and at a reacting temperature, sulfur dioxid in contact with a fluid containing oxygen and an inert fluid, one of which materials being in excess.

20. The process of making sulfuric anhydrid which consists in conveying to a heated sphere in which the temperature is maintained below the dissociating-point of sulfuric anhydrid, and at a reacting temperature, sulfur dioxid in contact with an excess of refrigerated fluid containing oxygen.

21. The process of making sulfuric anhydrid which consists in conveying to a heated sphere in which the temperature is maintained below the dissociating-point of sulfuric anhydrid, and at a reacting temperature, refrigerated sulfur dioxid in contact with a fluid containing oxygen.

22. The process of making sulfuric anhydrid which consists in uniting sulfur dioxid with oxygen and abstracting the heat evolved therefrom by the introduction into the body of combining gases of a refrigerated inert fluid, whereby the temperature is maintained below the dissociating-point of sulfuric anhydrid, and the heating of the walls of the reacting-chamber is avoided.

23. The process of making sulfuric anhydrid which consists in conveying a compressed gas to a reacting-chamber, and there allowing the compressed gas to expand in the presence of sulfur dioxid and an oxidizing agent, performing the oxidation of sulfur dioxid by supplying heat to a reacting-sphere within said chamber, and abstracting or neutralizing the heat which would naturally be evolved during the oxidation of the sulfur dioxid by varying the volume of gases admitted to the reaction-chamber.

24. The process of making sulfuric anhydrid which consists in conveying compressed sulfur dioxid to a reacting-chamber and there allowing the compressed gas to expand in the presence of an oxidizing agent, performing the oxidation of sulfur dioxid by supplying heat to a reacting-sphere within said chamber, and abstracting or neutralizing the heat which would naturally be evolved during the oxidation of the sulfur dioxid by varying the volume of gases admitted to the reaction-chamber.

25. The process of making sulfuric anhydrid which consists in conveying liquid sulfur dioxid to a reacting-chamber and there allowing the sulfur dioxid to expand in the presence of an oxidizing agent, performing the oxidation of sulfur dioxid by supplying heat to a reacting-sphere within said chamber, and abstracting or neutralizing the heat which would naturally be evolved during the oxidation of the sulfur dioxid by varying the volume of gases admitted to the reaction-chamber.

26. The process of making a compound composed of one atom of sulfur with three atoms of oxygen which consists in uniting constituents forming the same by heating them to a reacting temperature while within a body of inert refrigerating fluid capable of absorbing or abstracting the heat evolved by the reacting ingredients and thus maintaining the temperature below the point at which sulfuric anhydrid is dissociated by the action of heat.

In testimony whereof I affix my signature in presence of two witnesses.

HENRY SPENCER BLACKMORE.

Witnesses:
WARREN C. STONE,
C. C. WRIGHT.